(12) United States Patent
Gunawardana et al.

(10) Patent No.: US 12,450,291 B2
(45) Date of Patent: Oct. 21, 2025

(54) SYSTEMS AND METHODS FOR QUERYING A GRAPH DATA STRUCTURE

(71) Applicant: JPMORGAN CHASE BANK, N.A., New York, NY (US)

(72) Inventors: Yawwani Gunawardana, Eastleigh (GB); Adrian Stetco, Bournemouth (GB); Chad Lavy, Delaware, OH (US); Mani Keeran, Danville, CA (US); Xiran Shi, Mountain View, CA (US); Denis Kochedykov, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/491,640

(22) Filed: Oct. 20, 2023

(65) Prior Publication Data
US 2025/0131037 A1   Apr. 24, 2025

(51) Int. Cl.
*G06F 16/901* (2019.01)
*G06F 16/22* (2019.01)
*G06F 16/2457* (2019.01)

(52) U.S. Cl.
CPC ...... *G06F 16/9024* (2019.01); *G06F 16/2237* (2019.01); *G06F 16/24578* (2019.01)

(58) Field of Classification Search
None
See application file for complete search history.

(56) References Cited

U.S. PATENT DOCUMENTS

| | | | |
|---|---|---|---|
| 2012/0131139 A1* | 5/2012 | Siripurapu | H04L 65/60 709/217 |
| 2013/0103389 A1* | 4/2013 | Gattani | G06F 40/295 704/9 |
| 2017/0024461 A1* | 1/2017 | Mac an tSaoir | G06F 16/334 |
| 2018/0341720 A1* | 11/2018 | Bhatia | G06F 17/10 |
| 2019/0042933 A1* | 2/2019 | Powell | G06F 40/30 |
| 2019/0251422 A1* | 8/2019 | Ramanath | G06F 16/24578 |
| 2020/0265048 A1* | 8/2020 | Dotan-Cohen | G06F 16/338 |
| 2020/0301953 A1* | 9/2020 | Abhyankar | G06F 16/3328 |
| 2021/0158176 A1* | 5/2021 | Wan | G06F 18/22 |
| 2021/0216928 A1* | 7/2021 | O'Toole | G06F 16/29 |
| 2021/0295822 A1* | 9/2021 | Tomkins | G06F 16/3323 |

(Continued)

*Primary Examiner* — Khanh B Pham
*Assistant Examiner* — Navneet Gmahl
(74) *Attorney, Agent, or Firm* — GREENBERG TRAURIG LLP

(57) ABSTRACT

In some aspects, the techniques described herein relate to a method including: receiving a first list entity vector embedding, wherein the first list entity vector embedding is of a categorical type and is associated with a list entity; generating a first similarity score between the first list entity vector embedding and a stored vector embedding of a plurality of stored vector embeddings, wherein the stored vector embedding of the plurality of stored vector embeddings is of the categorical type and is associated with a stored entity; adding the first similarity score to a second similarity score, wherein the sum of the first similarity score and the second similarity score is an overall similarity score associated with the stored entity; querying a datastore to retrieve data associated with the stored entity; and returning, as output of the list expansion module, the data associated with the stored entity.

12 Claims, 8 Drawing Sheets

(56) References Cited

U.S. PATENT DOCUMENTS

| | | | |
|---|---|---|---|
| 2022/0188661 A1* | 6/2022 | Tappin | G06F 16/248 |
| 2023/0048742 A1* | 2/2023 | Mishra | G06V 30/413 |
| 2023/0086327 A1* | 3/2023 | Song | G06F 16/242 |
| | | | 382/159 |
| 2023/0350931 A1* | 11/2023 | Lewis | G06F 16/338 |
| 2023/0409622 A1* | 12/2023 | Mahabal | G06F 16/353 |
| 2024/0020321 A1* | 1/2024 | Mosenia | G06F 16/24578 |
| 2024/0265124 A1* | 8/2024 | Frattura | G06F 21/6218 |
| 2025/0130982 A1* | 4/2025 | Gunawardana | G06F 16/9024 |

* cited by examiner

SYSTEMS AND METHODS FOR QUERYING A GRAPH DATA STRUCTURE

BACKGROUND

1. Field of The Invention

Aspects generally relate to systems and methods for querying a graph data structure.

2. Description of the Related Art

A graph database includes nodes and edges as the primary data points that define the data structure. A node represents an entity, such as a person, a company, etc. An edge represents a relationship between two nodes. Nodes linked together by edges (relationships) form the topology of the data structure (i.e., a graph topology). Both edges and nodes can include properties, which are features or attributes of the edge or node. A node or edge type define what properties the node or edge will have. For instance, a company node may have a "description" property defined as a string value that describes the company in natural language terms. This naming convention of nodes, edges, and properties is known as a graph taxonomy. When searching a graph data structure for results similar to a known entity, a query platform can provide more relevant results if the platform incorporates both the topology and taxonomy as factors when determining results.

SUMMARY

In some aspects, the techniques described herein relate to a method, including: receiving, at a graph query platform, a natural language query; generating, by the graph query platform, a vector embedding from the natural language query; determining, by the graph query platform, a graph node property-level vector embedding that is similar to the vector embedding from the natural language query based on a similarity score, wherein the graph node property-level vector embedding is generated from a defined property of a graph node; generating, by the graph query platform, a plurality of vector embeddings based on data associated with the graph node; determining, by the graph query platform, a plurality of stored entities that are similar to the plurality of vector embeddings based on a similarity score that represents a similarity between the plurality of vector embeddings and a corresponding plurality of vector embeddings generated from each of the plurality of stored entities; and returning, as output of the graph query platform, data associated with each of the plurality of stored entities.

In some aspects, the techniques described herein relate to a method including: receiving, as input to a list expansion module, a first list entity vector embedding, wherein the first list entity vector embedding is of a categorical type and is associated with a list entity; generating, by the list expansion module, a first similarity score between the first list entity vector embedding and a stored vector embedding of a plurality of stored vector embeddings, wherein the stored vector embedding of the plurality of stored vector embeddings is of the categorical type and is associated with a stored entity; adding, by the list expansion module, the first similarity score to a second similarity score, wherein the sum of the first similarity score and the second similarity score is an overall similarity score associated with the stored entity; querying, by the list expansion module, a datastore to retrieve data associated with the stored entity; and returning, as output of the list expansion module, the data associated with the stored entity.

In some aspects, the techniques described herein relate to a method, including: multiplying, by the list expansion module, the first similarity score by a value of a first weight variable and the second similarity score by a value of a second weight variable.

In some aspects, the techniques described herein relate to a method, wherein the first list entity vector embedding is received from a user interface executing on a client device.

In some aspects, the techniques described herein relate to a method, wherein the data associated with the stored entity is returned to the user interface executing on the client device.

In some aspects, the techniques described herein relate to a method, including: receiving, as input to the list expansion module, a plurality of list entity vector embeddings, wherein each list entity vector embedding of the plurality of list entity vector embeddings of a different categorical type and is associated with the list entity.

In some aspects, the techniques described herein relate to a method, wherein the stored entity is a graph node.

In some aspects, the techniques described herein relate to a method, including: sorting the overall similarity score, wherein the sorting determines that the overall similarity score is in a top k number of similarity scores in terms of similarity to the list entity.

In some aspects, the techniques described herein relate to a method including: determining, by an embedding engine, a first plurality of nodes in a graph database; generating, by the embedding engine, a property-level vector embedding for each node of the first plurality of nodes, wherein each property-level vector embedding is based on a node property defined by each node of the first plurality of nodes; determining, by the embedding engine, a second plurality of nodes; generating by the embedding engine, a node-level vector embedding for each node in the second plurality of nodes, wherein each node-level vector embedding is based on a type of each node in the second plurality of nodes; and persisting, by the embedding engine, each property-level vector embedding and each node-level vector embedding in a vector database with an association to an index key.

In some aspects, the techniques described herein relate to a method, wherein determining the first plurality of nodes includes executing a graph query of the graph database.

In some aspects, the techniques described herein relate to a method, wherein the graph query includes a node type and a node property as parameters.

In some aspects, the techniques described herein relate to a method, wherein determining the second plurality of nodes includes executing a graph projection.

In some aspects, the techniques described herein relate to a method, wherein each node-level vector embedding is generated from a node captured in the graph projection.

In some aspects, the techniques described herein relate to a method, wherein the node property defined by each node of the first plurality of nodes is a string data type.

In some aspects, the techniques described herein relate to a method, wherein each index key in the vector database is related to a lookup key that uniquely identifies a node in the graph database.

DETAILED DESCRIPTION

Aspects generally relate to systems and methods for querying a graph data structure.

A graph database integrates multiple data sources to provide a comprehensive view of entities and relationships among entities represented in the graph. Unlike traditional tabular datasets a graph database provides a unified, curated view that emphasizes the relationships present between entities.

A semantic search engine has the benefit of understanding a context of a query, going beyond term searches to provide a more comprehensive set of results. A semantic search engine on its own, however, may not be able to take advantage of the topological taxonomic data that can be implemented in a graph data structure.

Aspects may include a graph query platform, which, given a list of entities (such as a list produced by a semantic search module or a manually provided list) can expand the list by determining similar entities based on graph embedding similarities. A graph query platform may extend the functionality of a semantic search. A semantic search, due to its textual input, may only be able to perform similarity determinations on a string-based property field of a graph entity (e.g., a graph node). A list expansion procedure as described herein, however, may expand an initial list of return values to a larger set of entities by using both property-level and node-level embeddings generated from a graph.

In an exemplary aspect, a graph database may include, e.g., information about companies. For instance, a graph may define a company node and each company node may include defined properties, such as a description property that includes a string value to describe the company in natural language terms. Other nodes in an exemplary company graph may include, e.g., an owner node, an investor node, a revenue node, an employee node, and still other nodes based on, e.g., geography and industry taxonomies.

An exemplary graph data structure may define a taxonomy and topology for industry that includes nodes such as "industry," "sector," "subsector," "NAICS_code" (where NAICS stands for North American Industry Classification System, which is a numeric value that maps a business to a sector/subsector of industry), etc. Each of these nodes may also have a set of properties and defined edges. For example, an industry node may be related to a sector node with a "contains" edge. Likewise, a sector node may be related to a subsector node with a "contains" edge. A company may be related to a NAICS_code with a "has_NAICS_Code" edge, and so on.

An exemplary geography taxonomy and topology may include nodes such as "city," "state," "country," "region," etc. A company node may be related to a city node via a "located_in" edge. A city node may be related to a state node with a "belongs_to" relationship. A state node, in turn, may be related to a country or region node with a "belongs_to" relationship edge, and so on.

Figure 1:
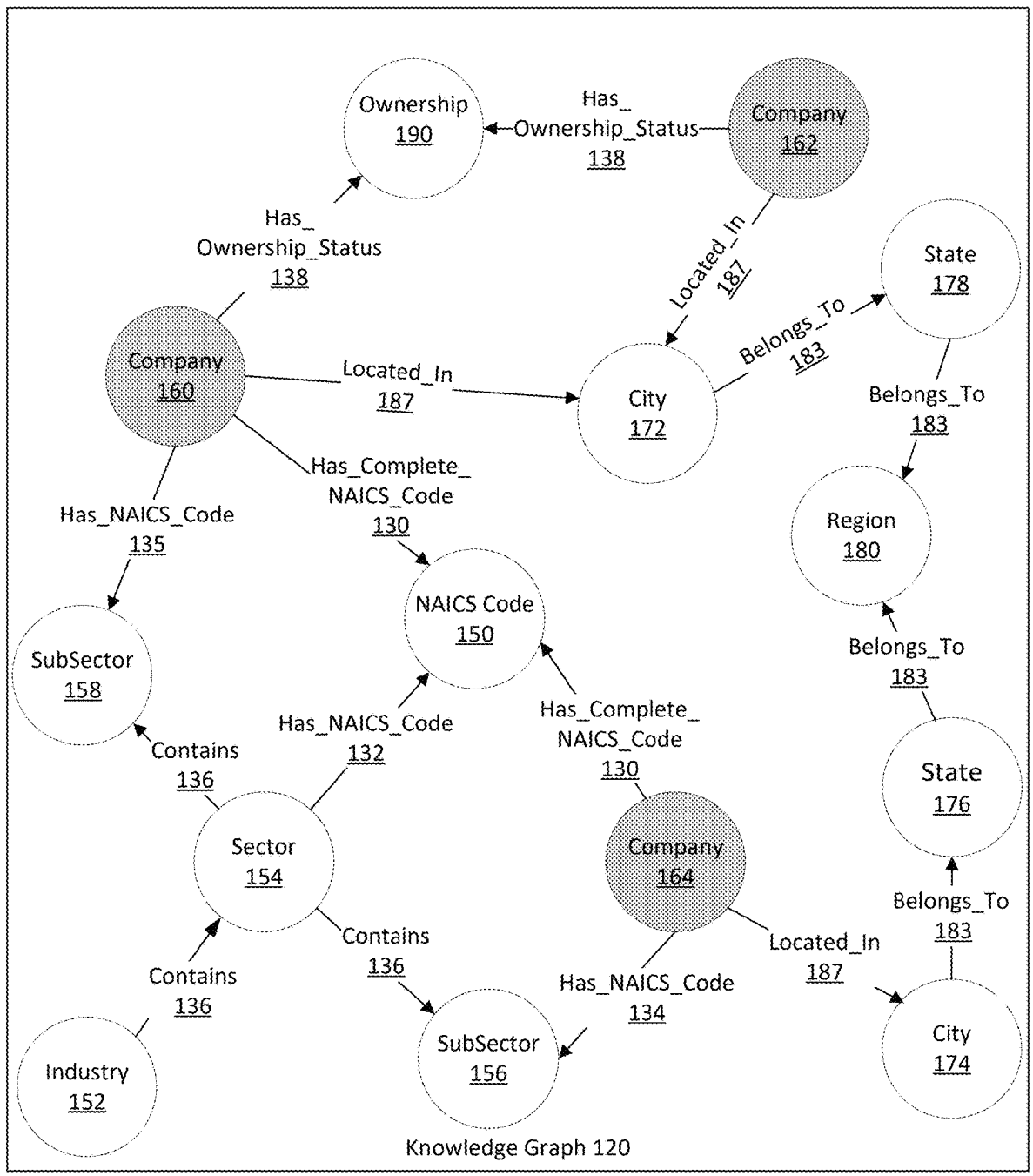
FIG. 1 is a diagram of a graph data structure, in accordance with aspects.

FIG. 1 is a diagram of a graph data structure, in accordance with aspects. Knowledge graph 120 depicts an exemplary graph taxonomy and topology. Knowledge graph 120 includes company node 160, company node 162, and company node 164. While knowledge graph 120 depicts company nodes along with other related nodes and edges, it is contemplated that knowledge graph 120 may be configured to store any types of nodes and edges in a graph format (e.g., person nodes, computer network device nodes, and so on), and a company-centric graph is merely exemplary and should not be viewed as limiting. Additionally, while knowledge graph 120 depicts a relatively small number of nodes and edges, graph data structures may (and often do) contain tens of millions of nodes and edges, or more. Accordingly, the number of nodes/edges depicted in knowledge graph 120 is exemplary only and should not be viewed as limiting.

Knowledge graph 120 further includes a geographic taxonomy and topology that includes city node 172, city node 174, state node 176, state node 178 and region node 180. Moreover, knowledge graph 120 includes an industrial taxonomy and topology that includes NAICS code node 150, industry node 152, sector node 154, subsector node 156, and subsector node 158. Knowledge graph 120 also includes ownership node 190.

The nodes of knowledge graph 120 are connected with defined edges. For instance, company node 160 is related to city node 172 with located_in edge 187. Likewise, company node 162 is related to city node 172 with located_in edge 187, indicating that a company represented by company node 162 is located in the same city as a company represented by company node 160. Moreover, by traversing the graph from company node 164, it can be understood that the company represented by company node 164 is located in the city represented by city node 174. Moreover, it can be seen, after a traversal of the geography graph nodes, that each of company node 160, company node 162 and company node 164 are related to region node 180 with belongs_to edge 183 (i.e., situated in the same region that is represented by region node 180.

Likewise, it can be determined that both company node 160 and company node 164 have a complete NAICS code by their relationship to NAICS code node 150 (i.e., has_complete_NAICS_Code edge 130). It can also be seen, via graph traversal, that company node 160 and company node 164 belong to the same industrial sector based on their indirect relationship to sector node 154 (i.e., for company node 160 through subsector node 158, and for company node 164 through subsector node 156). Accordingly, as can be seen with reference to knowledge graph 120, a graph can capture a similarity of nodes in terms of a "distance" or a number of hops between nodes.

In accordance with aspects, other nodes and edges of knowledge graph 120 include company node 160 related to ownership node 190 via has_ownership_status edge 138. Industry node 152 is related to sector node via contains edge 136. Additionally, sector is related to both subsector node 158 and subsector node 156 with contains edge 136. Sector node 154 is depicted as having an NAICS code via its relationship to NAICS code node 150 via has_NAICS_code edge 132. Moreover, company node 160 is shown as having a particular NAICS code that is mapped to subsector node 158 via has_NAICS_code 135, and company node 164 is shown as having a particular NAICS code that is mapped to subsector node 156 via has_NAICS_code 134.

In accordance with aspects, providing data in a graph data structure as taxonomies for nodes and edges (as opposed to node properties that are internal to a node or edge and cannot be traversed/projected as a graph topology) optimizes the graph in terms of data that may be mined and used in a list expansion procedure. For example, by capturing industry verticals and NAICS codes as nodes in an exemplary graph and expressing company relationships to these nodes with appropriate edges, two company nodes may be determined to be similar based on an industrial taxonomy/topology perspective if a number of hops between the two company nodes is below a certain threshold. A threshold may be defined in terms of a similarity score between vector embeddings generated from both search criteria and graph data). Such computations are much more difficult or even impossible where such values are expressed as categorical properties of a node having values (e.g., string values) only at the individual node level.

In accordance with aspects, a list expansion process may receive a list of search items and may expand the list to produce a result set based on a wide variety of parameters including parameters that reflect a graph taxonomy and topology through property-level and node-level embeddings. A list of search items may be values returned from a semantic query. A user may select a subset of search items that most closely reflects the criteria that the user wants to search on. A graph query platform, including a list expansion process, may compare embeddings generated for each entity in a received list to corresponding embeddings generated from graph nodes, edges, properties, etc., and generate a similarity score for each corresponding embedding or group of embeddings. A top k number of results (i.e., the top k most similar results) may be returned based on a value of a similarity score. A k variable may be an integer value that indicates a number of results for a graph query platform to return.

In accordance with aspects, a graph query platform may include, and/or be in operative communication with, a graph database that stores data in a graph structure. A graph query platform may be configured to traverse the graph database queries of the graph database and/or projections of a stored graph/subgraph and create both property-level and node-level numerical (e.g., vector) embeddings based on nodes traversed from within the graph database.

In accordance with aspects, property-level embeddings may be based on unidimensional properties that are associated with a node or an edge (i.e., node/edge properties, as discussed in more detail, above). Node properties may be numerical, categorical, ordinal, or textual. For instance, with reference to an exemplary company node, a property may be numerical (e.g., a number of employees), categorical (e.g., a type of ownership), or textual (e.g., a company description). Aspects may define a filtered subset of all available node properties that are useful in defining similarity between nodes at the property-level. Such a subset may be mined from a graph database and have a vector embedding process executed thereon.

In accordance with aspects, generating node-level embeddings may include converting nodes in a graph into vectors (e.g., low dimensional dense vectors), such that nodes which are connected to, or share, common or close neighbors (i.e., a low number of "hops") in a graph will be close (i.e., have a high similarity) in the embedding space and nodes which are far apart in the graph (i.e., a high number of hops) will be far away (i.e., have a low similarity) in the embedding space. Node embeddings may capture topological features of the nodes/graph.

In accordance with aspects, an embedding engine may execute an embedding pipeline that retrieves data from a graph database and generates both property-level and node-level vector embeddings based on the retrieved data. An embedding engine may be configured to retrieve graph data via a graph query language and/or graph projections. A graph query returns specified data from a graph database. A graph query may take particular parameters such as node and edge parameters and/or parameters based on node/edge properties and return data related to the supplied parameters. A graph projection is an in-memory instance of a graph that is stored in a graph database. A graph projection may be a specified part of a stored graph (i.e., a subgraph of an entire stored graph). Using graph queries and/or graph projections, an embedding engine may traverse graph nodes, inspect node properties, and generate node-level and property-level vector embeddings based on the traversed nodes. Node embedding models executed by an embedding engine may traverse a graph projection and produce node-level vector embeddings on some or all of the traversed nodes.

In accordance with aspects, property-level vector embeddings may be generated based on the results of a graph database query. An embedding engine may query a property graph for nodes and/or edges that include a value within a particular property field. For instance, in an exemplary graph that stores company nodes, each company node may include a "description" property field that takes a string value. The property field may be used to store a natural language entry that describes the corresponding company represented by the node. A graph query may be used to retrieve nodes that have a value in a specified property field (i.e., where the specified field is not null or blank). An exemplary graph database query may select company nodes where a description property is not null or not blank. In some aspects, not all nodes will have content in a queried field, and this may minimize a total number of nodes for which property-level embeddings can be performed. For example, only a fractional subset of company nodes may include a textual description in their "description" field, which may limit the number of property-level embeddings that can be generated to the number of corresponding nodes that include an actual description in a description property.

A graph database query may retrieve a limited number of nodes and specified property values in order to limit a returned dataset to a manageable size. Graph database queries may be executed periodically in order to retrieve companies added to a graph after a last execution of a query, thereby continually retrieving new node/edge property data for processing by a property-level embedding process. Because node/edge properties may be collected from different sources, retrieved property data (and, particularly, text/string-based data) may have different descriptions including multiple descriptions from different sources. Accordingly, aspects may aggregate a total property field, or may aggregate multiple values (e.g., multiple text entries) from related fields, before generation of a property-level embedding from the field or related fields.

In accordance with aspects, an embedding engine may generate node-level vector embeddings using graph projections. An embedding engine may load a projection of a portion of a graph into memory and perform a vector embedding process on the nodes/edges loaded in the projection. A projection may be based on a sub-graph that includes a set of nodes and edges that reflect a particular taxonomy of the graph. For instance, a projection may include nodes and edges that reflect a geographic taxonomy. That is, company nodes in an exemplary projection may be related by and through geographic edges and nodes (e.g., a first company node in a projection may be related with a "located_in" edge to a city node, which may further be related to a second company node with a second "located_in" edge, and so on). In this way, geographic nodes and their relationships to company nodes may be captured in vector embeddings and the embeddings may be stored in a vector database. Likewise, node embeddings may be performed on a projection related to an industry/industrial taxonomy, or any other graph/subgraph projection configuration based on a taxonomy included in a graph that may be extracted from a graph database and loaded into memory as a projection.

Figure 2:
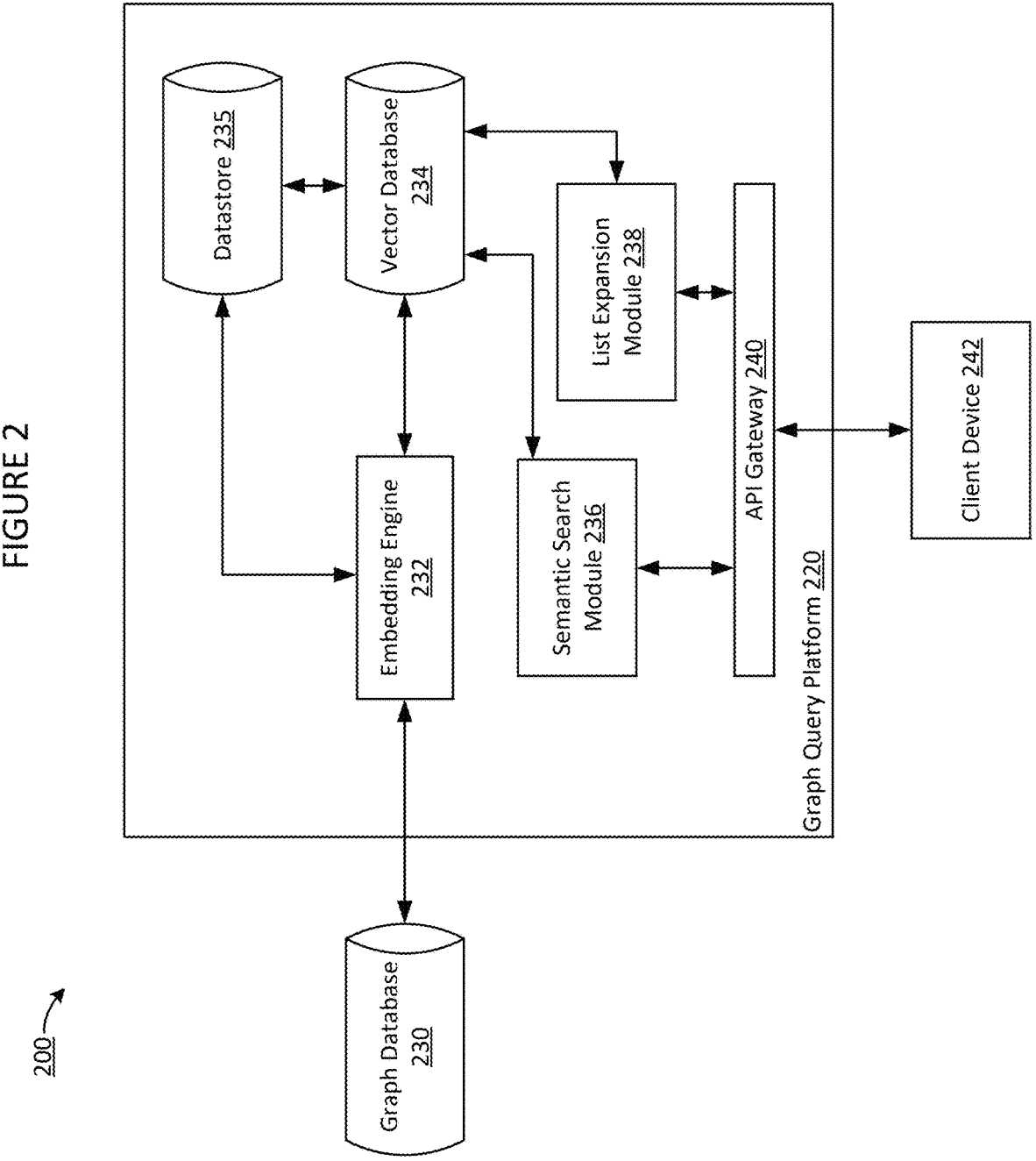
FIG. 2 is a block diagram of a query platform for querying a graph data structure, in accordance with aspects.

FIG. 2 is a block diagram of a query platform for querying a graph data structure, in accordance with aspects. System 200 includes graph query platform 220, which includes embedding engine 232, vector database 234, datastore 235, semantic search module 236, list expansion module 238, and API gateway 240. System 200 also includes graph database 230 and client device 242. While graph database 230 is depicted outside of graph query platform 220, in some aspects, graph query platform 220 may include graph database 230.

In accordance with aspects, graph query platform 220 and graph database 230 may be part of an implementing organization's technology infrastructure. Graph database 230 may be configured to store nodes and edges in a graph structure. Embedding engine 232 may be configured to be in operative communication with graph database 230 and may be further configured to traverse the nodes and edges of graph database 230 and perform embedding operations on the traversed nodes stored in graph database 230. Graph database 230 may be any suitable datastore for storing information in a graph structure. An exemplary graph database is the Neo4j® graph database system.

Embedding engine 232 may further be configured to be in operative communication with vector database 234 and may be configured to store property-level and node-level graph embeddings in vector database 234. Vector database 234 may be any suitable datastore for storing generated vectors and may be optimized for storing, retrieving, and/or comparing stored vector embeddings. Vector database 234 may store each vector embedding with a relationship or association to an index key. The index key may be used in query operations to identify a particular vector embedding and the data from where it came. An index key may be used as or may be related to a lookup key such as a primary key or unique identifier that links the index key and associated vector embedding to a particular graph node. This allows stored vectors to be mapped back to nodes and/or node properties from which a vector embedding was generated.

Embedding engine 232 may store data used to generate a vector embedding and an associated index key in datastore 235. Node data such as node names, and node properties may be stored in datastore 235 with an associated index key that is also stored with a corresponding vector embedding in vector database 234. Accordingly, when a vector embedding from vector database 234 is determined to be above a similarity threshold by graph query platform 220, the vector embedding's index key may be used as a lookup key, or used to determine a lookup key, in datastore 235 to retrieve the associated data from which the similar vector embedding was generated. Datastore 235 may be any suitable data store, such as a flat file (e.g., a comma separated value (.csv) file, etc.), a relational database, etc.

In some aspects, nodes and edges in graph database 230 may be configured with an index property and embedding engine 232 may store an index key as a property of the node/edge from which a corresponding vector embedding was produced. Accordingly, raw data corresponding to a vector embedding index may be queried with a graph query directly from graph database 230. This may render datastore 235 superfluous in such aspects. In some aspects, however, both graph database 230 and datastore 235 may be used to store index keys and corresponding data, or one or the other may be used, as discussed herein. Corresponding data may include other keys (e.g., primary keys or foreign keys, etc.), or may be combined with an index key to create new or additional lookup keys. In an exemplary datastore, a company name field may be an additional key.

Embedding engine 232 may generate property-level embeddings and node-level embeddings and store the embeddings in vector database 234. Semantic search module 236 and list expansion module 238 are both configured for operative communication with vector database 234 and may query vector database 234, as described in more detail, below. Client device 242 may communicate with semantic search module 236 and/or list expansion module 238 via API gateway 240. API gateway 240 may expose API methods that an interface (e.g., a graphical user interface) executing on client device 242 may call and provide method parameters or arguments for.

In accordance with aspects, a user may enter a natural language query in an interface executing on client device 242. The natural language query may be passed to semantic search module 236 which may detect various words in the natural language query in order to set a series of filters for filtering a query response. Semantic search module 236 may use regular expressions, other algorithmic techniques, or models including trained machine learning (ML) models to determine one or more words related to a set of predefined filter categories.

For instance, in an exemplary aspect where graph query platform 220 is configured to query collected company data, semantic search module 236 may be configured to determine one or more words in a natural language query that are related to ownership status, a geographic location, and/or type of business as filter categories when evaluating an initial natural language query.

In one example, given the natural language query "private owned pediatric services in Texas," semantic search module 236 may use regular expressions (or other suitable means) to determine that a natural language query includes words related to "private" ownership of a business (i.e., an ownership status filter category). Semantic search module 236 may further use regular expressions (or other suitable means) to determine that a natural language query references a business in "Texas" (i.e., a geographic location filter category). Further, semantic search module 236 may use a classifier model (or other suitable means) to compute an implied category of medical services (or even a finer category of "pediatric medical services") based on the word "pediatric" in the natural language search (i.e., a business type filter category).

Semantic search module 236 may set any predefined filter categories to corresponding values based on a received natural language query and filter categories and values determined from the natural language query. Accordingly, based on the above examples, an ownership status would be set to filter on (i.e., include) privately owned businesses, a geographic location filter may be set to filter on businesses in the state of Texas, and a business type may be set to filter on medical services businesses.

In accordance with aspects, semantic search module 236 may further encode a received natural language query into a vector embedding, where the vector embedding represents the semantic meaning of the words. Semantic search module 236 may perform a tokenization process on a received natural language query that may split text in a received query on white space, may remove punctuation and stop words, and may retain a set of words or terms referred to as tokens. Tokens may then be encoded into a vector embedding that represents the semantic meaning of the received natural language query.

As discussed herein, embedding engine 232 may traverse nodes in graph database 230 and perform property-level vector embedding on the properties of traversed nodes. A node's properties (such as a "description" property that is a string data type) may be tokenized/embedded in a same or similar manner as the embedding process described for received natural language queries. Property-level vector embeddings may be stored in vector database 234.

Semantic search module 236 may be configured to perform a query of vector database 234 and retrieve a number of property-level vectors that are most similar to a vector generated by semantic search module 236 based on a received natural language query. A query of vector database 234 may compare vector embeddings stored in vector database 234 with a vector embedding of a natural language query received as a lookup parameter from semantic search module 236. A dot product or cosign similarity may be used as a similarity metric, and index keys for each of a predefined number of matches (e.g., the top 2048) matches may be returned from vector database 234.

Graph query platform 220 may be configured to retrieve corresponding data (e.g., company data from which the similar vector embeddings were generated) from datastore 235 or graph database 230, depending on configuration. The returned data may then be filtered on predefined filter categories, as described, above. Nodes that pass through the filter process may be formatted for display in an interface executed by client device 242 and may be consumed by a user of client device 242. Filtered nodes may be passed to the interface as a return value of an API method exposed by API gateway 240 and called by the user interface.

In an exemplary aspect (and with reference to the filter categories/values discussed, above), records returned from a query of vector database 234 may be filtered for medical service companies in Texas that are privately owned. This filtering may further reduce the number of returned records (e.g., from datastore 235 or graph database 230) while making the results of the sematic search more relevant.

In accordance with aspects, a user of client device 242 may selected a number of records displayed as a result of a natural language query in a user interface (e.g., that are displayed as a returned value of a natural language query), or may provide a number of known records, as the basis for a list expansion performed by a graph query platform. For instance, upon receiving results from a semantic search processed by graph query platform 220, a user may select a number of highly relevant results on which to base a list expansion procedure. An interface may provide a checklist/box or other selection interface object by which a user may select a number of returned records.

In addition to selecting a number of relevant records, a user interface may further provide one or more weight-adjusting interface objects, whereby a user can adjust a weight that is applied to one or more category of embeddings. For instance, a return set of company records may display a value for each category of embeddings that are generated/stored. That is, for a returned record for a company may display a ownership value of "private" in a user interface, a geographic location of "Texas," an industry or business type of "medical," and so on for captured/stored embeddings. By using a text box, slider, dropdown box, or any other suitable interface object, a use may enter a weight to be applied to one or more categories. In an exemplary aspect, a user may be highly interested in geographic location, and may place a higher weight on that category. In another example, a user may care less about geographic location and more about an industry sector. Accordingly, the user may adjust the weight to emphasize industry sector in the expanded list results.

In accordance with aspects, if a user does not enter or adjust any weights, then default weight settings may be equal across all categorical embeddings. In some aspects, to minimize the complexity of setting weights via an interface object, profiles may be defined where a user can select between categorical embeddings (e.g., "geography", "revenue", "industry," or others) which will set a predefined weighting for similarity searches based on the category selected. In still other aspects, an interface may provide a text box where a user may enter a natural language description precedence among categories, and a ML model, such as a large language model, will translate the received language into weighting parameters that can be included in a list expansion procedure.

An API call from an interface executing on client device 242 to API gateway 240 may pass an index key or some other lookup key (e.g., a unique identifier used as a primary key) associated with each selected record to list expansion module 238. Upon receipt of a number of lookup keys by list expansion module 238, list expansion module 238 may retrieve, for each list item passed in, categorical embeddings stored for the list entity. For example, if a first company is passed as a list item to list expansion module 238, list expansion module 238 may retrieve stored embeddings for the list-item company's ownership data, geography data, industry vertical data, description property, other property-level embeddings, and other node-level embeddings. Such embedding retrievals may be performed for each entity in a received list of entities. In some aspects, if there are no stored embeddings for a list entity, vector embeddings may be generated in real time for the list entity in accordance with procedures discussed herein and for each categorical datapoint of the list entity that aligns with either property-level embeddings or node-level embeddings that are generated for a graph data structure at large.

In accordance with aspects, a similarity function may be performed on each categorical embedding of a list entity, where the similarity function determines a top k number of stored entities having the overall most similar vector embeddings to the list entity. For instance, a similarity function may take several embeddings of a list entity that are associated with corresponding categorical embeddings (e.g., an industry sector embedding, a geography embedding, etc., where the list entity is a company) as input and may compute a similarity score that determines and returns the k most similar stored entities based on the stored entities' corresponding vector embeddings.

Figure 3A:
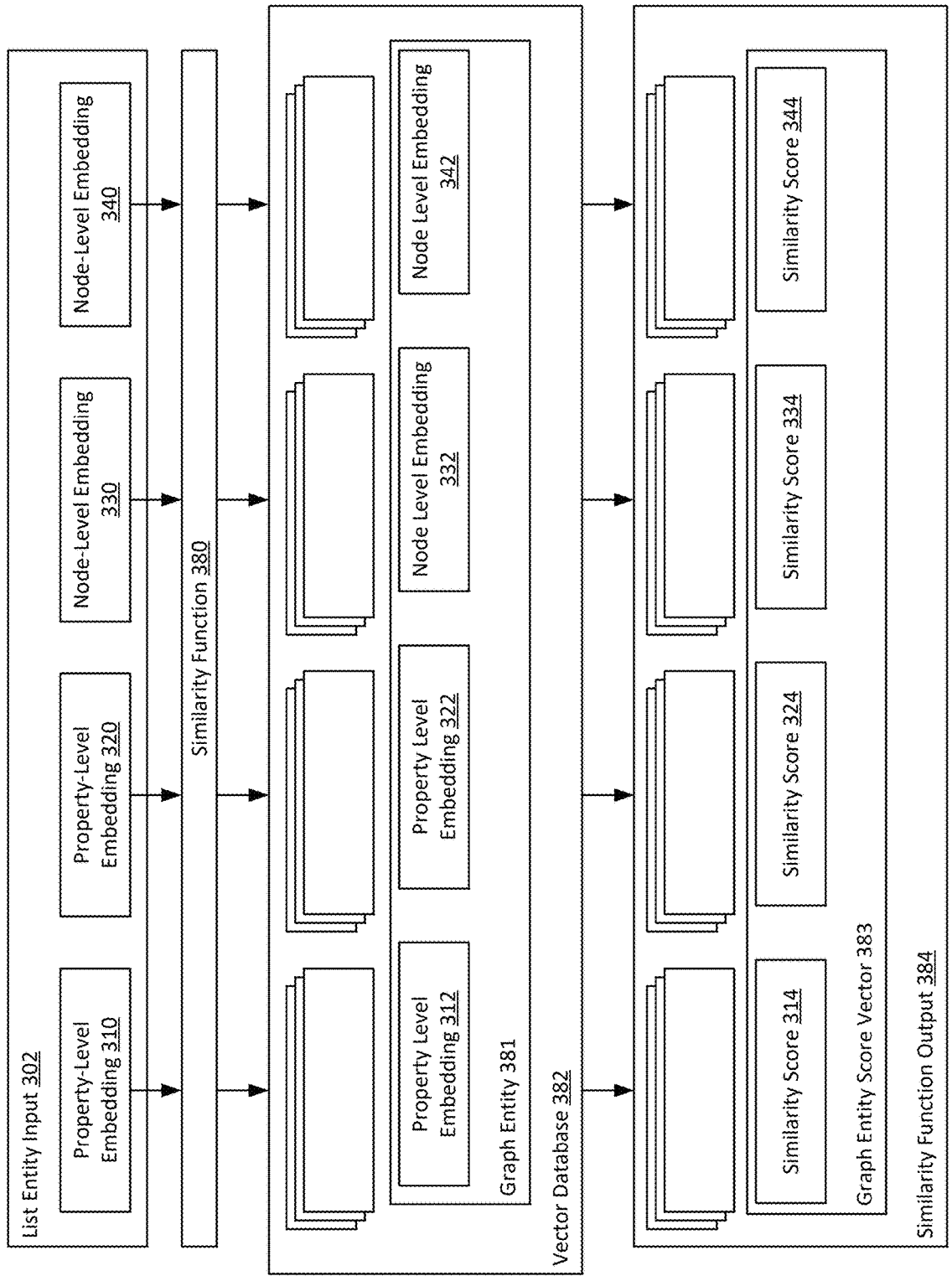
FIG. 3a is a block diagram of a similarity function carried out by a graph query platform, in accordance with aspects.

FIG. 3a is a block diagram of a similarity function that may be carried out by a graph query platform in accordance with aspects. FIG. 3a includes list entity input 302, similarity function 380, vector database 382, and similarity function output 384. Similarity function 380 may be executed by, e.g., by a list expansion module of a graph query platform. List entity input 302 includes property-level embedding 310, property-level embedding 320, node-level embedding 330, and node-level embedding 340. The embeddings of list entity input 302 may represent categorical vector embeddings that are retrieved or generated for a list entity and passed to a list expansion module of a graph query platform. The embeddings of list entity input 302 are exemplary only and a list input entity may have more or fewer embeddings. In accordance with aspects, embeddings retrieved or generated for a list entity may align (fully or partially) with a taxonomy and/or topology of an associated graph data structure.

Each of property-level embedding 310, property-level embedding 320, node-level embedding 330, and node-level embedding 340 may be passed to similarity function 380 as input. Similarity function 380 may compute a similarity (e.g., a dot product or cosign similarity) between each embedding of a list entity passed to it and each categorically corresponding embedding of each stored entity that is stored in vector database 382. Similarity function output 384 may be a vector of similarity scores including a dimension for each category of embedding that is computed.

Vector database 382 may be a vector database of a graph query platform as discussed in more detail, herein. Vector database 382 may store categorical vector embeddings generated from a graph entity. These may be property-level embedding or node-level embeddings depending on a graph taxonomy and/or topology. Property-level embedding 312, property-level embedding 322, node-level embedding 332, and node-level embedding 342 represent embeddings associated with graph entity 381. Vector database 382 may hold many more (e.g., millions or tens of millions more entity embeddings) associated with other graph entities. Property-level embedding 312, property-level embedding 322, node-level embedding 332, and node-level embedding 342 correspond, categorically, to the embeddings of list entity input 302—that is, to property-level embedding 310, property-level embedding 320, node-level embedding 330, and node-level embedding 340, respectively.

In accordance with aspects, each of property-level embedding 310, property-level embedding 320, node-level embedding 330, and node-level embedding 340 may be passed to similarity function 380 as input. Similarity function 380 may compute a similarity (e.g., a dot product or cosign similarity) between each embedding of list entity input 302 passed to it and each categorically corresponding embedding of each stored entity that is stored in vector database 382. For example, similarity function 380 may calculate a similarity between property-level embedding 310 and property-level embedding 312, between property-level embedding 320 and property-level embedding 322, between node-level embedding 330 and node-level embedding 332, and between node-level embedding 340 and node-level embedding 342.

Similarity function output 384 may be a vector of similarity scores for each graph entity having embeddings stored in vector database 382. For instance, similarity function output 384 may include a vector for each graph entity that includes one or more dimensions for each category of embedding for which a similarity score is computed. Graph entity score vector 383 may be a vector output associated with graph entity 381. It may include similarity score 314, similarity score 324, similarity score 334, and similarity score 344 as dimensions. Similarity function 380 may output similar similarity score vectors for each graph entity associated with vectors stored in vector database 382.

In accordance with aspects, a list expansion module may receive a weighting factor for each category of embedding that will be computed by a similarity function. These may be default weight factors, user-supplied weight factors, etc. (discussed in more detail, above). A list expansion module may apply received weighting factors across similarity scores generated for embeddings associated with a graph entity and may generate a sum of each similarity score multiplied by each corresponding weighting factor to generate an overall similarity score for a graph entity. For instance, an equation for generating an overall similarity score may be: (weight 1)(similarity score 1)+(weight 2)(similarity score 2)+ . . . +(weight n)(similarity score n)=overall similarity score.

Figure 3B:
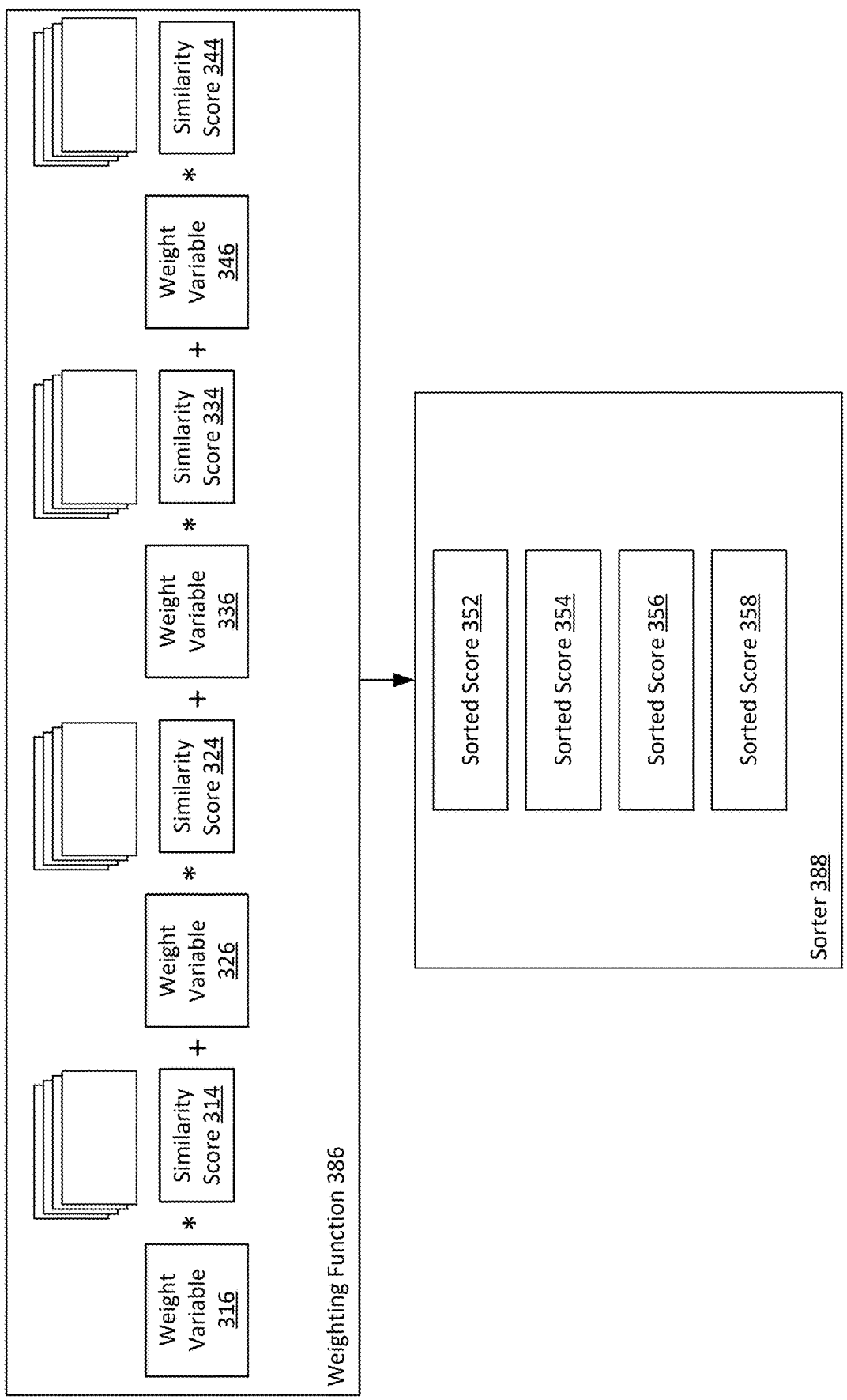
FIG. 3b is a is a block diagram of a weighting function carried out by a graph query platform in accordance with aspects.

FIG. 3b is a is a block diagram of a weighting function that may be carried out by a graph query platform in accordance with aspects. In FIG. 3b, an asterisk ("*") represents multiplication and the plus symbol ("+") represents addition. FIG. 3b includes weighting function 386 and sorter 388. Weighting function 386 may be executed by, e.g., a list expansion module of a graph query platform. Weighting function 386 may receive weighting factors as input. Weighting factors may be received from a user interface, as discussed in more detail, above. Weighting function 386 may receive a weighting factor for each similarity score received from a similarity function. The weighting factors may correspond to categorical embeddings associated with graph entities and stored in a vector database.

In accordance with aspects, weighting function 386 receives similarity score 314, similarity score 324, similarity score 334, and similarity score 344 from similarity function 380. Moreover, weighting function 386 receives weight variable 316 that is associated with the embedding category to which similarity score 314 belongs, weight variable 326 that is associated with the embedding category to which similarity score 324 belongs, weight variable 336 that is associated with the embedding category to which similarity score 334 belongs, and weight variable 346 that is associated with the embedding category to which similarity score 344 belongs. Weighting variables may be set to the value of a corresponding weighting factor received, e.g., from a user interface. In some aspects, if no weighting factors are received, all weightings variables may be set to a fixed and even value (e.g., 1) that will evenly weight all similarity scores. Weighting function 386 may receive and weight all similarity scores calculated by similarity function 380. Similarity score 314, similarity score 324, similarity score 334, and similarity score 344 represent one instance of a set of similarity scores of a graph entity score vector (e.g., graph entity score vector 383) that is associated with one instance of a graph entity (e.g., graph entity 381).

For each graph entity score vector received from similarity function 380, weighting function 386 may multiply a similarity score by a corresponding weight variable and may calculate the sum total of each multiplication operation to produce an overall similarity score for an associated graph entity. When an overall similarity score for each received graph entity score vector has been calculated, sorter 388 may sort each score and may retrieve the graph entities associated with the top k scores. In some aspects, k may be an integer that is received as user input from a user interface. For instance, sorter 388 has sorted the top four (4) overall similarity scores received from weighting function 386. That is, sorted score 352 is the score indicated as the most similar to list entity input 302, sorted score 354 is the score indicated as the second-most similar to list entity input 302, sorted score 356 is the score indicated as the third-most similar to list entity input 302, and sorted score 358 is the score indicated as the fourth-most similar to list entity input 302. In accordance with aspects, a list expansion module may query a data store for data associated with an identifier of the graph entity that is associated with each of the top k sorted scores and populate a user interface with the queried data.

In accordance with aspects, because a similarity function may receive several list entity inputs, that each produce k results, the top-k results intersection of each list entity input may be sorted and returned.

Figure 4:
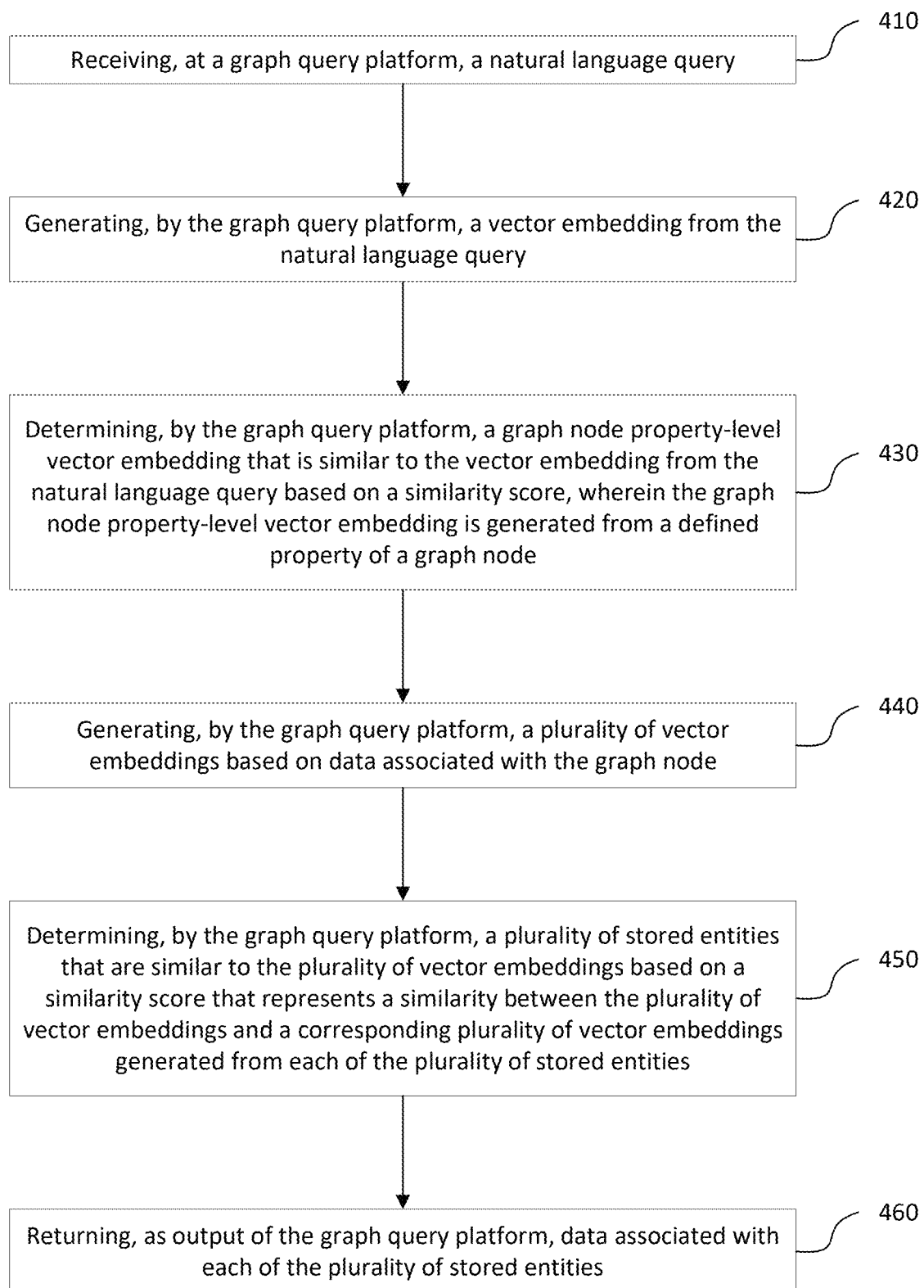
FIG. 4 is a logical flow for query execution at a graph query platform, in accordance with aspects.

FIG. 4 is a logical flow for a query execution at a graph query platform, in accordance with aspects.

Step 410 includes receiving, at a graph query platform, a natural language query.

Step 420 includes generating, by the graph query platform, a vector embedding from the natural language query.

Step 430 includes determining, by the graph query platform, a graph node property-level vector embedding that is similar to the vector embedding from the natural language query based on a similarity score, wherein the graph node property-level vector embedding is generated from a defined property of a graph node]

Step 440 includes generating, by the graph query platform, a plurality of vector embeddings based on data associated with the graph node.

Step 450 includes determining, by the graph query platform, a plurality of stored entities that are similar to the plurality of vector embeddings based on a similarity score that represents a similarity between the plurality of vector embeddings and a corresponding plurality of vector embeddings generated from each of the plurality of stored entities.

Step 460 includes returning, as output of the graph query platform, data associated with each of the plurality of stored entities.

Figure 5:
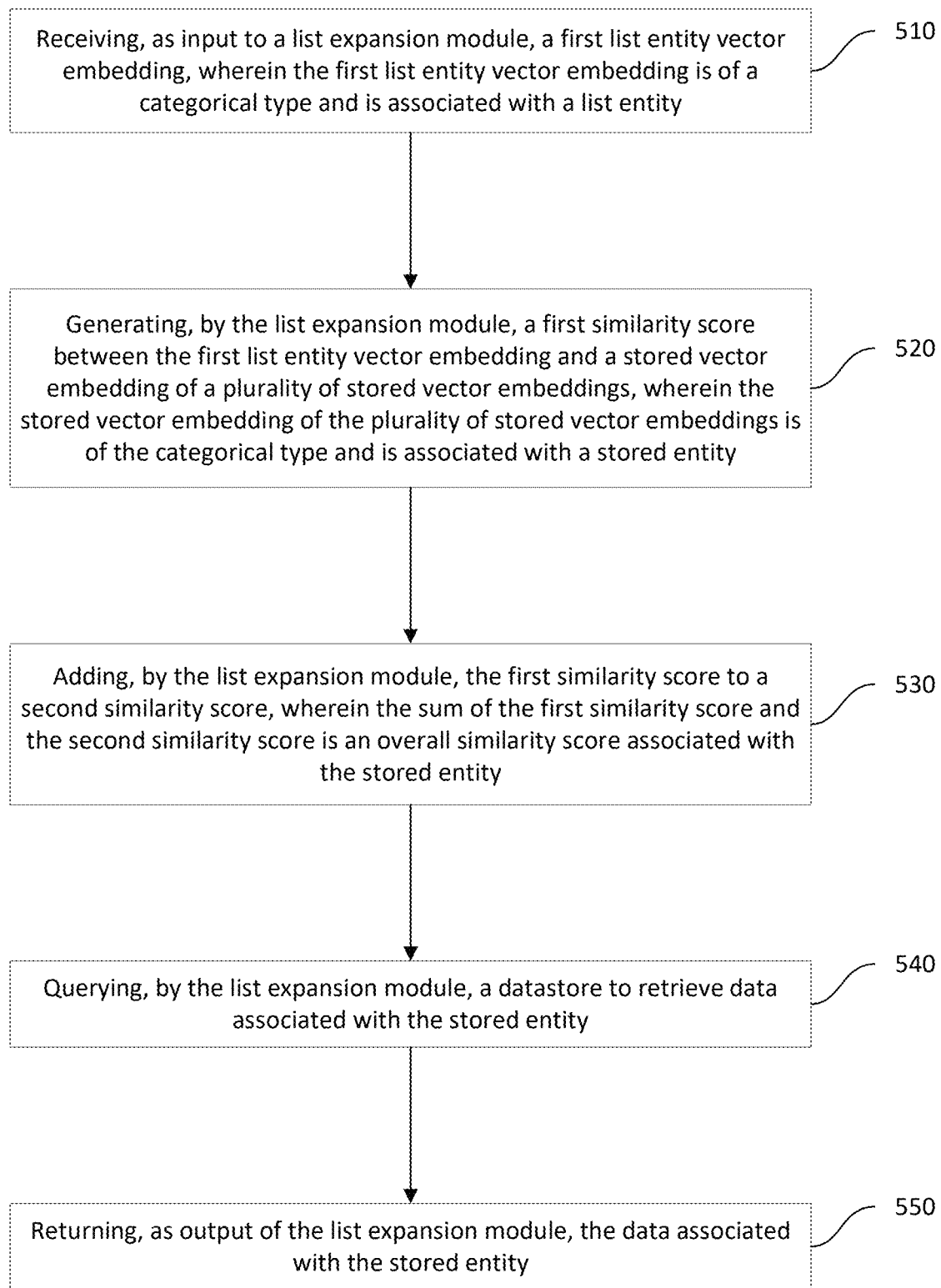
FIG. 5 is a logical flow for a list expansion module, in accordance with aspects.

FIG. 5 is a logical flow for a list expansion module, in accordance with aspects.

Step 510 includes receiving, as input to a list expansion module, a first list entity vector embedding, wherein the first list entity vector embedding is of a categorical type and is associated with a list entity.

Step 520 includes generating, by the list expansion module, a first similarity score between the first list entity vector embedding and a stored vector embedding of a plurality of stored vector embeddings, wherein the stored vector embedding of the plurality of stored vector embeddings is of the categorical type and is associated with a stored entity.

Step 530 includes adding, by the list expansion module, the first similarity score to a second similarity score, wherein the sum of the first similarity score and the second similarity score is an overall similarity score associated with the stored entity.

Step 540 includes querying, by the list expansion module, a datastore to retrieve data associated with the stored entity.

Step 550 includes returning, as output of the list expansion module, the data associated with the stored entity.

Figure 6:
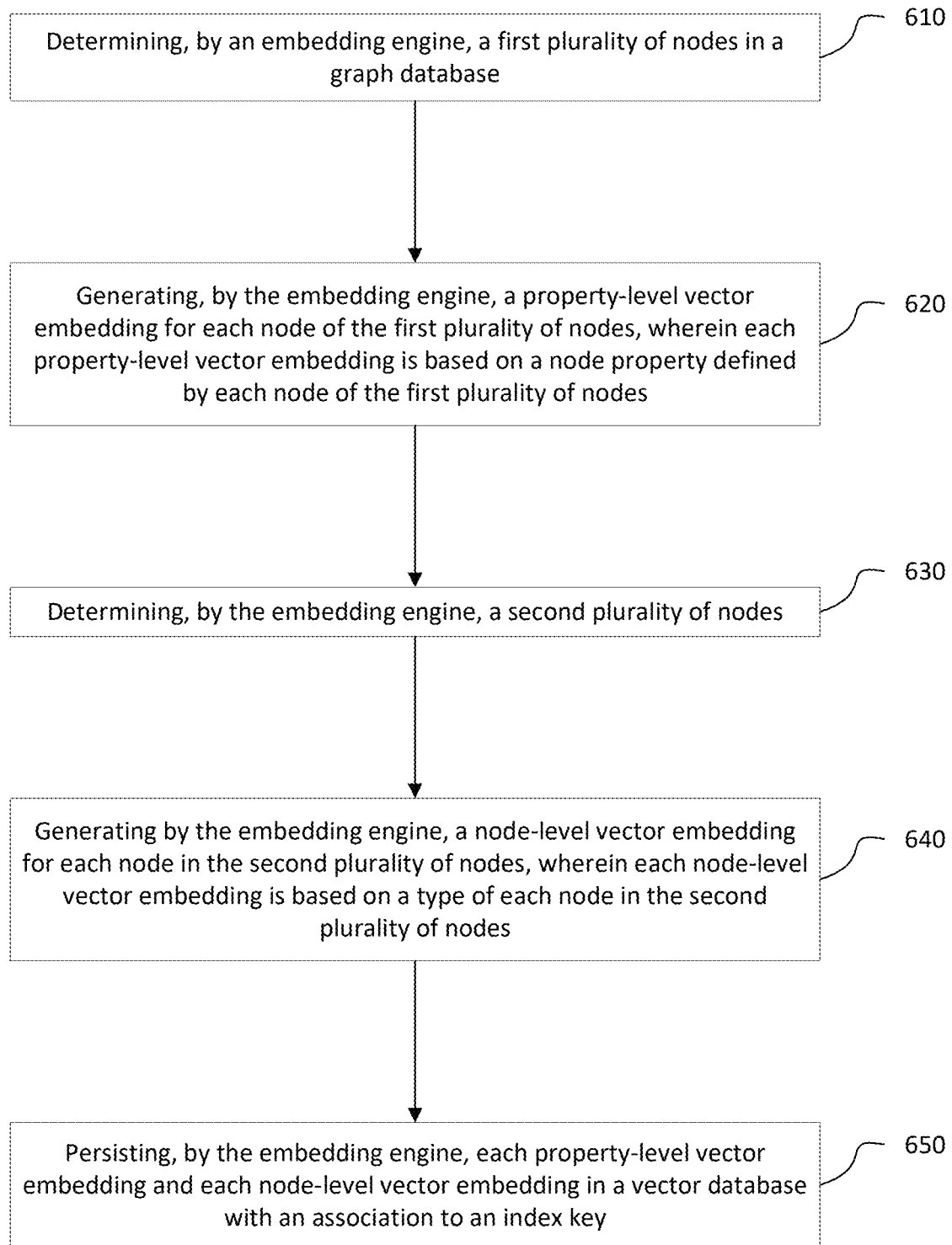
FIG. 6 is a logical flow of an embedding process, in accordance with aspects.

FIG. 6 is a logical flow of an embedding process, in accordance with aspects.

Step 610 includes determining, by an embedding engine, a first plurality of nodes in a graph database.

Step 620 includes generating, by the embedding engine, a property-level vector embedding for each node of the first plurality of nodes, wherein each property-level vector embedding is based on a node property defined by each node of the first plurality of nodes.

Step 630 includes determining, by the embedding engine, a second plurality of nodes.

Step 640 includes generating by the embedding engine, a node-level vector embedding for each node in the second plurality of nodes, wherein each node-level vector embedding is based on a type of each node in the second plurality of nodes.

Step 650 includes persisting, by the embedding engine, each property-level vector embedding and each node-level vector embedding in a vector database with an association to an index key.

Figure 7:
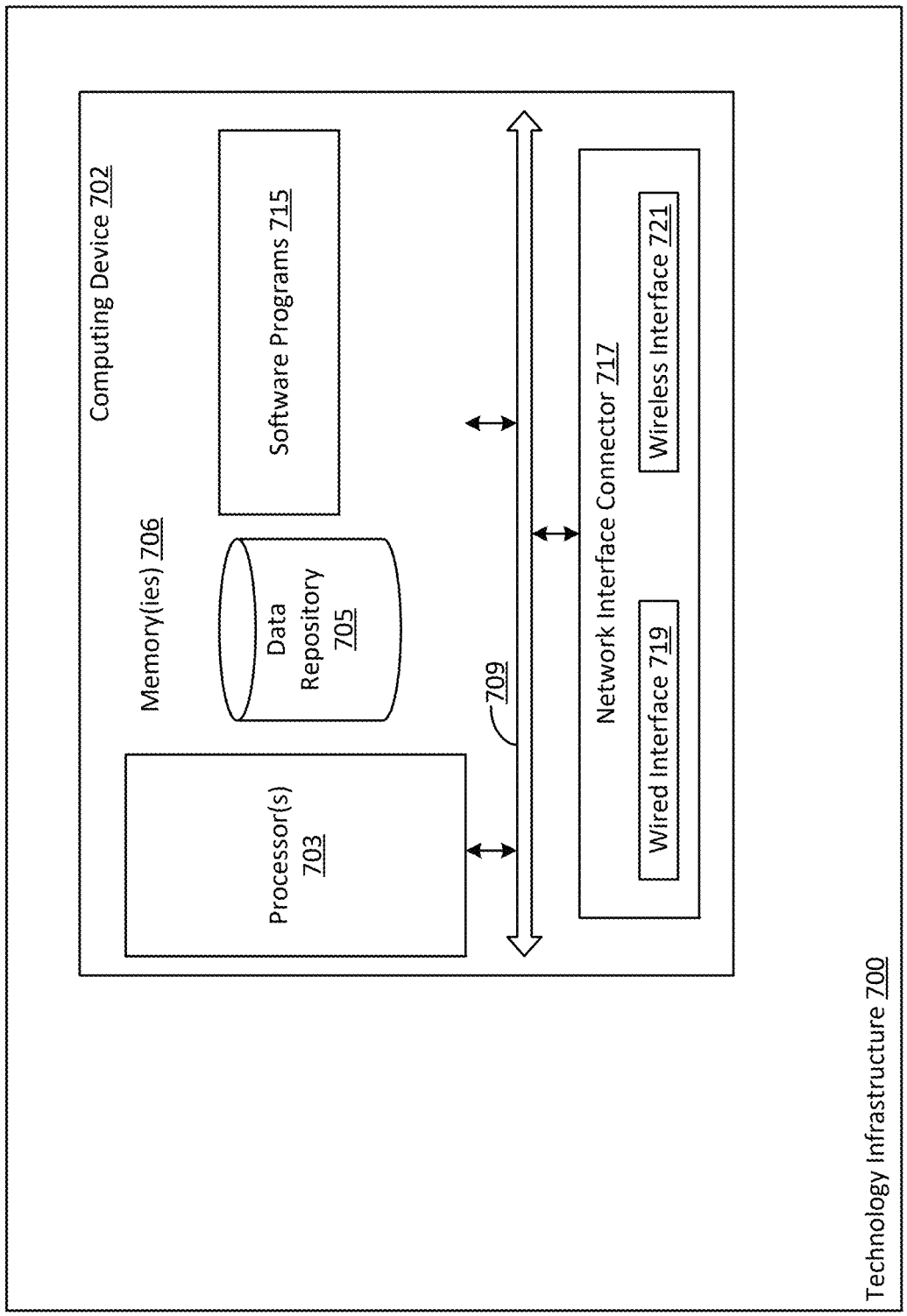
FIG. 7 is a block diagram of a technology infrastructure and computing device for implementing certain aspects of the present disclosure, in accordance with aspects.

FIG. 7 is a block diagram of a technology infrastructure and computing device for implementing certain aspects of the present disclosure, in accordance with aspects. FIG. 7 includes technology infrastructure 700. Technology infrastructure 700 represents the technology infrastructure of an implementing organization. Technology infrastructure 700 may include hardware such as servers, client devices, and other computers or processing devices. Technology infrastructure 700 may include software (e.g., computer) applications that execute on computers and other processing devices. Technology infrastructure 700 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 700 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 700 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 700 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper of fiber optic wire/cable) that forms a physical computer network. Routers, switches, and firewalls may also have "wireless" interfaces that facilitate data transmissions via radio waves. A computer network included in technology infrastructure 700 may include both wired and wireless components and interfaces and may interface with servers and other hardware via either wired or wireless communications. A computer network of technology infrastructure 700 may be a private network but may interface with a public network (such as the internet) to facilitate operative communication between computers executing on technology infrastructure 700 and computers executing outside of technology infrastructure 700.

FIG. 7 further depicts exemplary computing device 702. Computing device 702 depicts exemplary hardware that executes the logic that drives the various system components described herein. Servers and client devices may take the form of computing device 702. While shown as internal to technology infrastructure 700, computing device 702 may be external to technology infrastructure 700 and may be in operative communication with a computing device internal to technology infrastructure 700.

In accordance with aspects, system components such as an embedding engine, a semantic search module, a list expansion module, an interface, client devices, servers, a graph database, a vector database, other various database engines and database services, and other computer applications and logic may include, and/or execute on, components and configurations the same, or similar to, computing device 702.

Computing device 702 includes a processor 703 coupled to a memory 706. Memory 706 may include volatile memory and/or persistent memory. The processor 703 executes computer-executable program code stored in memory 706, such as software programs 715. Software programs 715 may include one or more of the logical steps disclosed herein as a programmatic instruction, which can be executed by processor 703. Memory 706 may also include data repository 705, which may be nonvolatile memory for data persistence. The processor 703 and the memory 706 may be coupled by a bus 709. In some examples, the bus 709 may also be coupled to one or more network interface connectors 717, such as wired network interface 719, and/or wireless network interface 721. Computing device 702 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   determining, by a computer application executed by a computing device, a first plurality of nodes in a graph database stored on a memory accessible by the computer application;
   generating, by the computer application, a first list entity vector embedding for each node of the first plurality of nodes, wherein each first list entity embedding is based on a node property defined by each node of the first plurality of nodes;
   determining, by the computer application, a second plurality of nodes in the graph database;
   determining, by the computer application, the first list entity vector embedding is of a categorical type and is associated with a list entity;
   generating, by the computer application, a first similarity score between the first list entity vector embedding and a stored vector embedding of a plurality of stored vector embeddings, wherein the stored vector embedding of the plurality of stored vector embeddings is of the categorical type and is associated with a stored entity, wherein the plurality of stored vector embeddings includes a vector for each stored entity that includes one or more dimensions for each category of embedding for which a similarity score is computed;
   multiplying, by the computer application, the first similarity score by a value of a first weight variable to form a first weighted similarity score and the second similarity score by a value of a second weight variable to form a second weighted similarity score, wherein the first weight variable and the second weight variable are associated with embedding categories to which the first similarity score and the second similarity score belong, respectively;
   adding, by the computer application, the first weighted similarity score to the second weighted similarity score, wherein a sum of the first weighted similarity score and the second weighted similarity score is an overall similarity score associated with the stored entity;
   persisting, by the computer application, each property-level vector embedding and each node-level vector embedding in a vector database with an association to an index key;
   querying, by the computer application, a datastore to retrieve data associated with the stored entity based on the index key to determine a related graph node and associated node data;
   returning, as output of the computer application, the data associated with the stored entity;
   sorting, by a sorter of the computer application, the overall similarity score of the stored entities, wherein the sorting determines that the overall similarity score is in a top k number of similarity scores in terms of similarity to the stored entity;
   retrieving, by the sorter of the computer application, the stored entities associated with the top k number of similarity scores;

querying, by a list expansion module, a data store for data associated with an identifier of the stored entities associated with the top k number of similarity scores; and populating, by the list expansion module, a user interface with the queried data.

2. The method of claim 1, wherein the first list entity vector embedding is received from the user interface executing on a client device.

3. The method of claim 2, wherein the data associated with the stored entity is returned to the user interface executing on the client device.

4. The method of claim 1, comprising:

receiving, as input to the computer application, a plurality of list entity vector embeddings, wherein each list entity vector embedding of the plurality of list entity vector embeddings of a different categorical type and is associated with the list entity.

5. A system comprising at least one computer including a processor and a memory, wherein the at least one computer is configured to:

determine, by a computer application executed by a computing device, a first plurality of nodes in a graph database stored on a memory accessible by the computer application;

generate, by the computer application, a first list entity vector embedding for each node of the first plurality of nodes, wherein each first list entity embedding is based on a node property defined by each node of the first plurality of nodes, wherein the plurality of stored vector embeddings includes a vector for each stored entity that includes one or more dimensions for each category of embedding for which a similarity score is computed;

multiply, by the computer application, the first similarity score by a value of a first weight variable to form a first weighted similarity score and the second similarity score by a value of a second weight variable to form a second weighted similarity score, wherein the first weight variable and the second weight variable are associated with embedding categories to which the first similarity score and the second similarity score belong, respectively;

add, by the computer application, the first weighted similarity score to the second weighted similarity score, wherein a sum of the first weighted similarity score and the second weighted similarity score is an overall similarity score associated with the stored entity;

persist, by the computer application, each property-level vector embedding and each node-level vector embedding in a vector database with an association to an index key;

query, by the computer application, a datastore to retrieve data associated with the stored entity based on the index key to determine a related graph node and associated node data;

return, as output of the computer application, the data associated with the stored entity;

sort, by a sorter of the computer application, the overall similarity score of the stored entities, wherein the sorting determines that the overall similarity score is in a top k number of similarity scores in terms of similarity to the stored entity:

retrieve, by the sorter of the computer application, the stored entities associated with the top k number of similarity scores;

query, by a list expansion module, a data store for data associated with an identifier of the stored entities associated with the top k number of similarity scores; and populate, by the list expansion module, a user interface with the queried data.

6. The system of claim 5, wherein the first list entity vector embedding is received from the user interface executing on a client device.

7. The system of claim 6, wherein the data associated with the stored entity is returned to the user interface executing on the client device.

8. The system of claim 5, wherein the at least one computer is configured to:

receive, as input to the computer application, a plurality of list entity vector embeddings, wherein each list entity vector embedding of the plurality of list entity vector embeddings of a different categorical type and is associated with the list entity.

9. A non-transitory computer readable storage medium, including instructions stored thereon, which instructions, when read and executed by one or more computer processors, cause the one or more computer processors to perform steps comprising:

determining, by a computer application executed by a computing device, a first plurality of nodes in a graph database stored on a memory accessible by the computer application;

generating, by the computer application, a first list entity vector embedding for each node of the first plurality of nodes, wherein each first list entity embedding is based on a node property defined by each node of the first plurality of nodes;

determining, by the computer application, a second plurality of nodes in the graph database;

determining, by the computer application, the first list entity vector embedding is of a categorical type and is associated with a list entity;

generating, by the computer application, a first similarity score between the first list entity vector embedding and a stored vector embedding of a plurality of stored vector embeddings, wherein the stored vector embedding of the plurality of stored vector embeddings is of the categorical type and is associated with a stored entity, wherein the plurality of stored vector embeddings includes a vector for each stored entity that includes one or more dimensions for each category of embedding for which a similarity score is computed;

multiplying, by the computer application, the first similarity score by a value of a first weight variable to form a first weighted similarity score and the second similarity score by a value of a second weight variable to form a second weighted similarity score, wherein the first weight variable and the second weight variable are associated with embedding categories to which the first similarity score and the second similarity score belong, respectively;

adding, by the computer application, the first weighted similarity score to the second weighted similarity score, wherein a sum of the first weighted similarity score and the second weighted similarity score is an overall similarity score associated with the stored entity;

persisting, by the computer application, each property-level vector embedding and each node-level vector embedding in a vector database with an association to an index key;

querying, by the computer application, a datastore to retrieve data associated with the stored entity based on the index key to determine a related graph node and associated node data;

returning, as output of the computer application, the data associated with the stored entity;

sorting, by a sorter of the computer application, the overall similarity score of the stored entities, wherein the sorting determines that the overall similarity score is in a top k number of similarity scores in terms of similarity to the stored entity;

retrieving, by the sorter of the computer application, the stored entities associated with the top k number of similarity scores;

querying, by a list expansion module, a data store for data associated with an identifier of the stored entities associated with the top k number of similarity scores; and populating, by the list expansion module, a user interface with the queried data.

10. The non-transitory computer readable storage medium of claim 9, wherein the first list entity vector embedding is received from the user interface executing on a client device.

11. The non-transitory computer readable storage medium of claim 10, wherein the data associated with the stored entity is returned to the user interface executing on the client device.

12. The non-transitory computer readable storage medium of claim 9, comprising:

receiving, as input to the computer application, a plurality of list entity vector embeddings, wherein each list entity vector embedding of the plurality of list entity vector embeddings of a different categorical type and is associated with the list entity.

* * * * *